United States Patent [19]

Mueller et al.

[11] 3,964,404

[45] June 22, 1976

[54] SHELF AND CORNER POST ASSEMBLY

[75] Inventors: Floyd F. Mueller; William A. Gelbuda, both of Two Rivers, Wis.

[73] Assignee: American Hospital Supply Corporation, Evanston, Ill.

[22] Filed: May 9, 1975

[21] Appl. No.: 576,038

[52] U.S. Cl................... 108/144; 52/753 D; 248/188; 403/217
[51] Int. Cl.² .......................... A47B 9/00
[58] Field of Search ........... 108/106, 144, 148, 107, 108/110, 156; 248/188, 143; 52/753 D, 758 H; 403/207, 217

[56] References Cited
UNITED STATES PATENTS

| 3,280,767 | 10/1966 | Kahn | 108/144 |
| 3,747,540 | 7/1973 | Salkoff et al | 108/156 |

Primary Examiner—James C. Mitchell
Attorney, Agent, or Firm—Dawson, Tilton, Fallon & Lungmus

[57] ABSTRACT

A shelf and corner post assembly wherein the shelf is adjustable into any of a variety of selected elevations. Each of the generally cylindrical corner posts is provided with one or more series of indentations adapted to receive arm portions of a U-shaped clip. A screw urges the clip into engagement with the post to clamp the post within a corner section of the perimetric frame of the shelf. A corner brace is secured to the frame and, in one form, extends horizontally between the upper and lower arms of the clip. The frame includes flanges which slope to promote drainage and edges which are spaced from the clip to prevent possible dirt accumulation and to facilitate assembly.

25 Claims, 7 Drawing Figures

U.S. Patent   June 22, 1976   Sheet 1 of 3   3,964,404
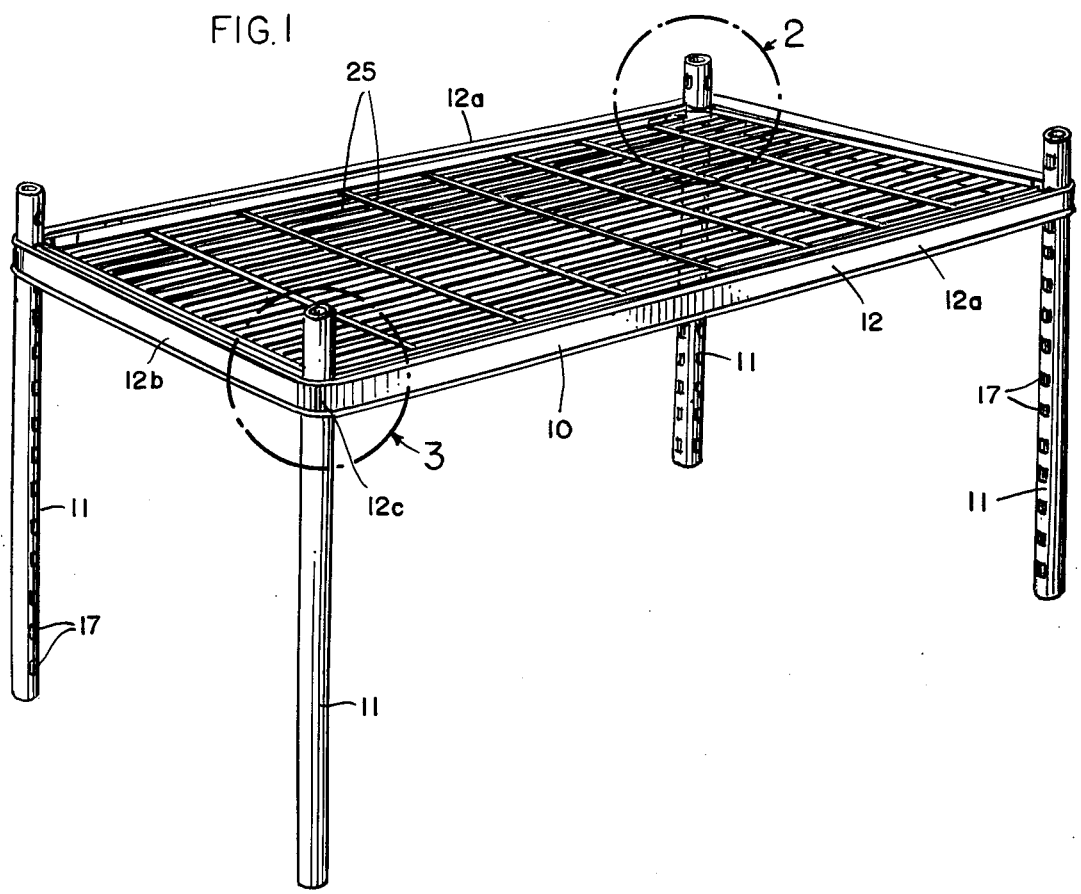
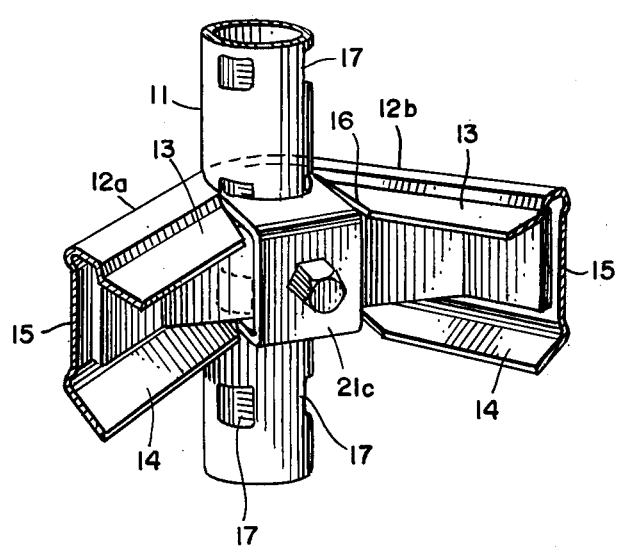
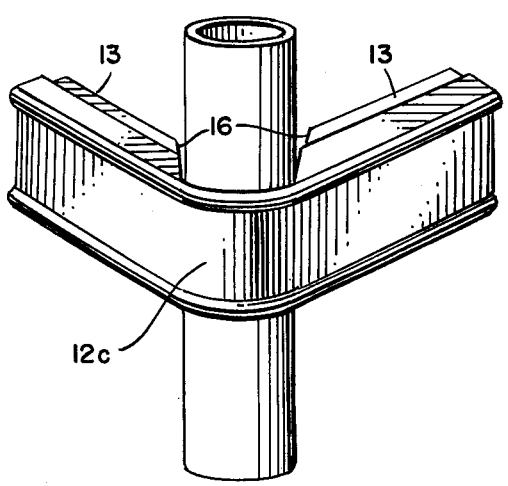

SHELF AND CORNER POST ASSEMBLY

BACKGROUND

Conventional adjustable metal shelving commonly includes set screws for anchoring the shelves at selected elevations. The screws are turned until they tightly engage the metal corner posts. Overtightening of the screws could damage the posts or, in some cases, strip the threads of the screw. On the other hand, should the screws be too loose, or should they become loosened during use, the stability of the entire structure could be affected and the equipment or articles supported by the loosened shelf could fall and become damaged. Furthermore, the set screw arrangement, while offering an advantage of infinite adjustability, also has the disadvantage of providing little or no indication of just when a shelf is level, thereby presenting a real possibility that such a shelf might be tightened while in a slightly tipped condition, with consequential effects on the alignment and stability of the assembly as a whole.

U.S. Pat. Nos. 3,280,767 and 3,344,756 illustrate constructions in which set screws directly engage the corner posts to hold the shelves in position. A modified construction, in which a set screw is used but does not directly engage the post, is disclosed in U.S. Pat. No. 3,747,540. U.S. Pat. Nos. 3,424,111, 3,523,508 and 3,757,705 teach constructions in which set screws are eliminated and the shelves are held in place upon circumferentially grooved posts by sleeves equipped with portions receivable in the grooves. Co-owned U.S. Pat. No. 3,589,746 teaches a system in which the shelves are locked in place with friction corner braces. While the constructions of the latter four patents all provide good stability and load support strength, such advantages are offset at least in part by their relative complexity and the absence of smooth uninterrupted surfaces that could simplify manufacture and facilitate cleaning and maintenance.

SUMMARY

The present invention relates to improved adjustable shelving which is relatively simple in construction and operation and which offers high load strength and stability. Because each post has a smooth outer aspect, and because the supporting uprights for the shelves are not formed of welded wire members, the assembly has a smooth uncluttered appearance. Also, since the outwardly-directed surfaces of the posts lack grooves and projections, there is less likelihood that forceful contact between such smooth outer surfaces and some other object (as where a cart embodying the invention is accidentally urged into forceful engagement with a piece of equipment or furniture) will either result in damage to the other object or will deform the post to an extent sufficient to interfere with further adjustment and mounting of shelves. Although screws are used for securing a shelf to the posts, the screws do not themselves engage the posts. Instead, the screws control positive locking means in the form of clips having projections which seat within indentations in the posts to secure the shelf at any selected elevations.

More specifically, each post is provided with a single or double series of recesses or indentations for receiving terminal portions of the arms of a U-shaped clip. The shelf is provided with a perimetric frame defining corner sections, each corner section extending about and engaging the smooth non-indented surface of one of the posts. A horizontal brace bridges frame portions adjacent each corner and a screw, threadedly carried by the brace, holds the arms of the clip in tight wedging engagement with the bearing surfaces of the indentations.

Each post is generally cylindrical in shape and the corner section of the shelf's perimetric frame has an inside radius of curvature matching the radius of curvature of the post. In the best mode presently known for practicing the invention, each post has two series of vertically-spaced indentations, the two series being arranged in spaced parallel relation and corresponding indentations of the respective series being disposed at the same elevations. The corresponding indentations of the respective series are thus arranged in pairs. Each arm of the U-shaped clip is provided at its free end with a pair of projections which are receivable in any selected pair of the recesses or indentations. Each indentation includes a bearing surface which lies along a vertical plane parallel with the axis of the post, the planes of each pair of indentations intersecting each other at an angle within the range of about 30° to 120°.

The perimetric frame is generally C-shaped in vertical section and includes upper and lower flanges joined by a generally vertical connecting wall. The lower flanges slope inwardly and downwardly to facilitate drainage, and the upper flanges have their top surfaces generally flush with the upper arms of the adjacent corner clips when the parts are fully assembled. Despite the flush relationship, limited spacing is nevertheless provided between the clips and the upper flanges to promote drainage and prevent or reduce the retention of liquids and solids.

Other objects and advantages will appear from the following specification and drawings.

DRAWINGS

FIG. 1 is a perspective view of assembled adjustable shelving embodying the present invention;

FIG. 2 is an enlarged fragmentary sectional view of the corner construction viewed from the inside angle of the corner;

FIG. 3 is a fragmentary perspective view similar to FIG. 2 but illustrating the corner construction viewed from the outside angle of the corner;

DESCRIPTION

Figure 4:
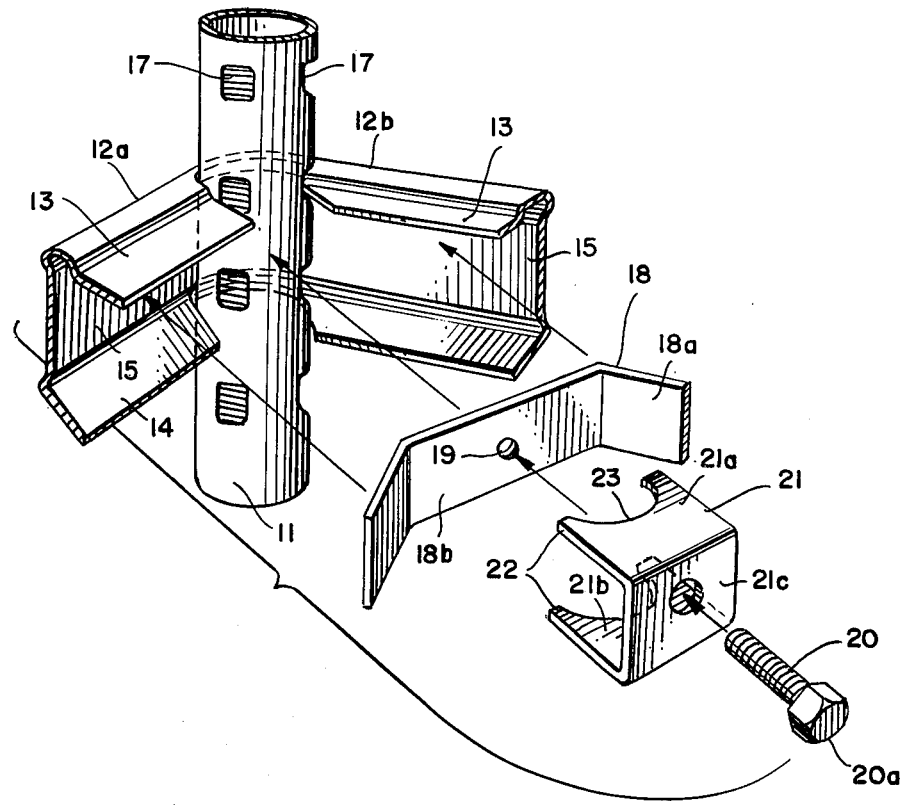
FIG. 4 is a fragmentary exploded perspective view illustrating the relationship of parts.

Referring to the drawings, FIG. 1 illustrates an assembly comprising a shelf 10 and corner posts 11. It is to be understood that extraneous or duplicative structure has been omitted, and that while FIG. 1 illustrates an operatively complete assembly, posts 11 would normally be of greater length than shown, a plurality of shelves having identical fastening means would be provided and would be arranged in vertically-spaced series, and the posts might constitute the frame members of a shelf cart similar to the cart illustrated in U.S. Pat. No. 3,589,746.

The shelf 10 includes a perimetric rectangular frame 12 defined by longitudinal frame members 12a and transverse frame members 12b. Referring to FIG. 2, it will be observed that each frame member is generally C-shaped in cross sectional configuration, having an upper flange 13, a lower flange 14, and a generally vertical connecting wall 15. The lower flange 14 slopes inwardly and downwardly at an angle within the range of approximately 10° to 20°, preferably about 15°, to insure proper drainage.

Figure 5:
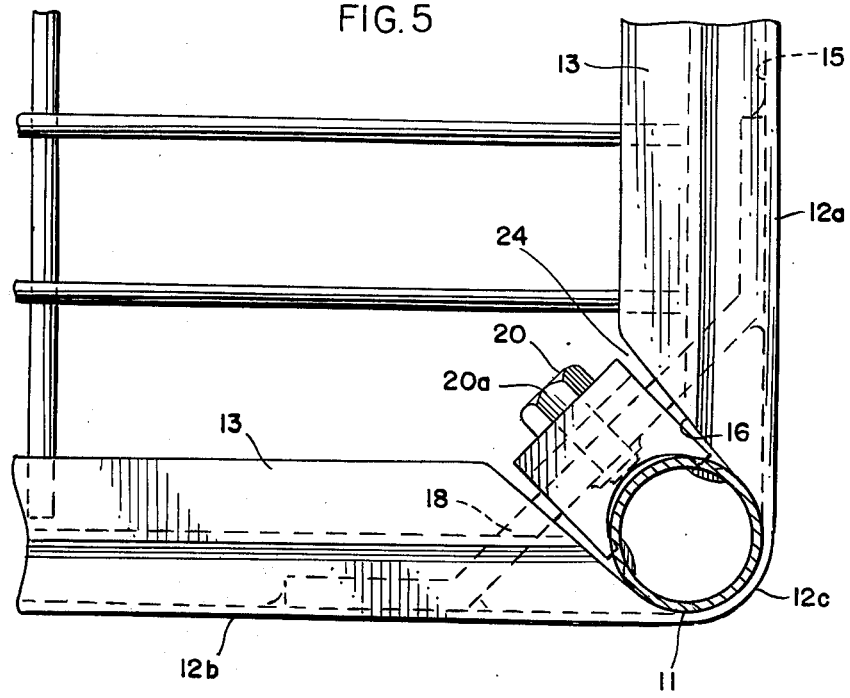
FIG. 5 is a fragmentary horizontal sectional view illustrating the cooperation between the shelf, post, and related elements when the parts are assembled.
Figure 6:
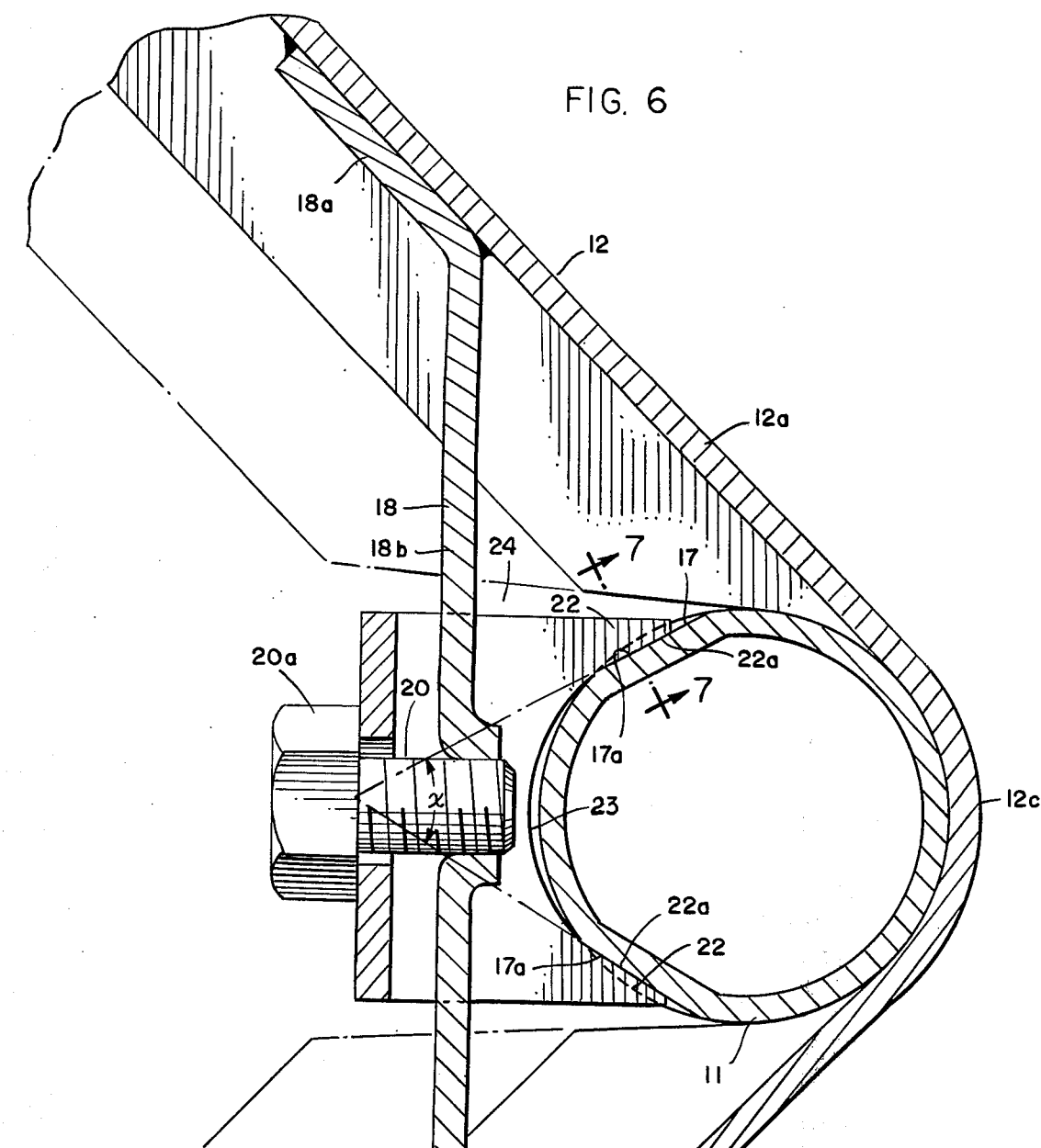
FIG. 6 is a still further enlarged horizontal sectional view showing the relationship of the assembled parts.

The side frame members 12a and 12b merge smoothly to provide arcuate corner sections 12c for the perimetric frame. As indicated in FIGS. 3, 5, and 6, the inside surface of the vertical wall of each corner section has the same curvature as the outside surface of posts 11. Flanges 13 and 14 terminate at the corner sections to provide recesses or cutouts 16 for receiving each of the posts.

Figure 7:
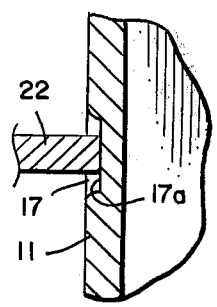
FIG. 7 is a fragmentary vertical sectional view taken along line 7—7 of FIG. 6.

While the posts might have other configurations, the generally cylindrical configuration illustrated in the drawings has been found particularly effective because of ease of manufacture and maintenance, and because of the strength which such a configuration contributes not only to the posts but to the assembly as a whole. The posts are illustrated as being tubular or hollow. In the embodiment depicted in the drawings, each post has two longitudinal series of vertically-spaced recesses or indentations 17. It will be noted that the corresponding indentations of the two parallel series are at the same levels, so that a pair of such indentations is provided at each level. Each indentation includes a vertical bearing surface 17a (FIGS. 6 and 7), the bearing surfaces of adjacent indentations of each pair extending along planes which intersect at an angle $x$ falling within the general range of 30° to 120° (FIG. 6). Particularly effective results have been obtained where the angle is approximately 60° as shown.

Referring to FIGS. 4-6, it will be observed that a brace 18 bridges adjacent frame members 12a and 12b, the brace including end portions 18a which are welded or otherwise permanently secured to the inside surfaces of walls 15 and an intermediate spanning portion 18b which is spaced from the corner section 12c of the frame a distance substantially greater than the outside diameter of post 11 (FIGS. 5 and 6). The intermediate portion 18b is provided with a central horizontally-extending threaded aperture 19 for receiving screw 20.

The enlarged head 20a of the screw bears against a generally U-shaped clip 21, the clip in turn cooperating with the post to anchor the parts securely together. In FIG. 4, it will be observed that the clip includes upper arm 21a, lower arm 21b, and vertical connecting portion 21c. The arms are parallel, being spaced apart a distance corresponding to the distance between successive pairs of indentations 17 of the post, and are provided at their free ends with bearing means in the form of laterally spaced projections or fingers 22. The bearing surfaces 22a provided by such projections engage the bearing surfaces 17a of the post indentations to secure the parts together when screw 20 is tightened. It will be noted that each arm is provided with an arcuate edge 23 which extends between bearing edges or surfaces 22a but which does not itself engage the post or interfere with the development of a tight wedging interconnection between the projections of the clip and the indented surfaces of the post.

While the intermediate portion 21c of each clip might be imperforate and be disposed between brace 18 and post 11, so that the clip in its entirety would be disposed between the brace and post and the intermediate portion 21c of the clip would simply constitute a bearing surface engaged by the end of screw 20, the construction illustrated is advantageous in terms of both appearance and function. The upper and lower arms of the clip conceal the brace and the top surface of upper arm 21a is substantially flush with the adjacent upper surfaces of frame flanges 13 (FIG. 3). The upper arm, in particular, therefore performs a protective concealing function although, to insure proper drainage, limited spacing 24 is provided between the adjacent edges of the flanges and arms (FIGS. 5 and 6). When the parts are assembled, the only portion of the screw 20 opened to view is the enlarged head 20a (the threaded shank is completed concealed by the clip) and, because of the relatively large area of contact between head 20a and the back or intermediate portion 21c, the formation of a tight frictional interlock is promoted without, at the same time, tending to cause deformation or damage to the parts. Screw 20 therefore constitutes adjustable connecting means which, in combination with clip 21 and brace 18, effectively secures the shelf 12 and post 11 together in any of the available positions of adjustment. It is to be noted that even when screw 20 is tightened to urge the bearing edges of the clip into wedging engagement with the indentations of the post, the end of the screw (opposite from head 20a) remains spaced from the outer surface of the post (FIG. 6).

While each arm of the clip has been shown as being provided with a pair of projections engageable with the indented post, it will be understood that a greater or lesser number of such projections might be provided. Also, the shelf 10 has been depicted in the form of a wire shelf having a grille of longitudinal and transverse wire members 25 welded or otherwise secured to the perimetric frame 12, it will be appreciated that the shelf may instead be provided with a solid (or perforated) sheet metal panel in lieu of the grille.

While in the foregoing an embodiment of the invention has been disclosed in considerable detail for purposes of illustration, it will be understood by those skilled in the art that many of these details may be varied without departing from the spirit and scope of the invention.

We claim:

1. A shelf and corner post combination, said post having at least one series of vertically-spaced recesses, said shelf including a perimetric frame having adjacent frame members merging to define a corner section, said shelf also including a horizontal brace spanning said adjacent frame members and spaced inwardly from said corner section, said post being freely receivable between said corner section and said brace for selective adjustment of the elevation of said shelf, a U-shaped clip having spaced upper and lower arms joined by a connecting portion, at least one of said arms being provided at the free end thereof with bearing means selectively receivable in each of the recesses of said series, and adjustable connecting means for securing said clip and brace together and for urging said bearing means into engagement with said recessed post to clamp said post between said clip and the corner section of said frame.

2. The combination of claim 1 in which said brace extends between said post and said connecting portion of said clip.

3. The combination of claim 2 in which said brace is provided with a threaded opening and said connecting portion of said clip is provided with an opening registrable with said threaded opening, said adjustable connecting means comprising a screw extending through both of said openings and terminating short of engagement with said post, said screw including an enlarged head engagable with the connecting portion of said clip for urging said clip into engagement with said post when said screw is threaded towards said post.

4. The combination of claim 1 in which said post is generally cylindrical in configuration.

5. The combination of claim 4 in which said corner section of said shelf frame is arcuate, said arcuate corner section having a surface engageable with said post, said surface having substantially the same curvature as the outer surface of said post.

6. The combination of claim 1 in which said post has two of said series of vertically-spaced recesses, said two series being disposed in spaced parallel relation and corresponding recesses of the respective series being at the same elevation, whereby, the recesses of the respective series are arranged in laterally-spaced pairs, said bearing means comprising a pair of laterally-spaced projections at the free end of at least one of said arms, said projections being selectively receivable in said pairs of recesses of said post.

7. The combination of claim 6 in which said recesses comprise indentations defining vertical bearing surfaces, said paired projections of said clip being slidably engageable with said bearing surfaces of a pair of recesses as said clip is advanced towards said post.

8. The combination of claim 7 in which said bearing surfaces lie along vertical planes parallel with the axis of said post, said planes intersecting each other at an angle falling within the range of about 30° to 120°.

9. The combination of claim 8 in which said angle is approximately 60°.

10. The combination of claim 7 in which each arm of said clip is provided with a pair of said projections, the projections of the respective arms being receivable in the recesses of two vertically adjacent pairs of such recesses.

11. The combination of claim 1 in which said arms of said clip are formed integrally with the connecting portion thereof.

12. The combination of claim 1 in which each of said arms is provided at the free end thereof with said bearing means, said bearing means of said arms being simultaneously receivable in pairs of recesses of said vertical series.

13. The combination of claim 1 in which said side frame members of said shelf include upper flanges, said upper flanges having top surfaces generally flush with the top surface of the clip's upper arm when the parts are assembled.

14. The combination of claim 1 in which said frame members are generally C-shaped in vertical section and include upper and lower flanges joined by a substantially vertical connecting wall, said lower flange sloping inwardly and downwardly from said vertical wall.

15. The combination of claim 14 in which said flanges and the arms of said clip have adjacent edges spaced apart to accommodate drainage flow.

16. A shelf and corner post assembly, said post being generally cylindrical in configuration and having at least one series of vertically-spaced indentations, said shelf including a perimetric frame having adjacent frame members merging to define an arcuate corner section, said arcuate corner section having a wall portion engaging the surface of said post and having a curvature conforming with the curvature of said post, said shelf also including a brace spanning said adjacent frame members and spaced from said post along a side thereof diametrically opposite from the engagement between said post and said corner section, said post being freely receivable between said corner section and said brace for selective adjustment of the elevation of said shelf, a U-shaped clip having spaced upper and lower arms joined by an integral connecting portion, at least one of said arms being provided at the free end thereof with bearing means selectively receivable in the indentations of said series, and screw means cooperating with said clip and brace for urging said clip towards said post and for securing said bearing means in a selected indentation of said series to lock said shelf against movement relative to said post.

17. The assembly of claim 16 in which said brace extends between said post and said connecting portion of said clip, and between said upper and lower arms of said clip.

18. The assembly of claim 17 in which said brace is provided with a threaded opening and said connecting portion of said clip is provided with an opening registrable with said threaded opening, said screw means extending through both of said openings and terminating short of engagement with said post, said screw means having an enlarged head frictionally engagable with the connecting portion of said clip for holding said clip in firm engagement with said post.

19. The assembly of claim 16 in which said post has two of said series of vertically-spaced indentations, said two series being disposed in spaced parallel relation to each other with the indentations of one series being at the same elevations as the corresponding indentations of the other of said series, whereby, the indentations of the respective series are arranged in laterally-spaced pairs, said bearing means comprising a pair of laterally-spaced projections at the free end of at least one of said arms, said projections being selectively receivable in said pairs of indentations.

20. The assembly of claim 19 in which said laterally-spaced projections are provided at the free ends of both of said arms, the vertical spacing between the projections of the upper and lower arms corresponding with the vertical spacing between the indentations of said post, whereby, the projections of said upper and lower arms are simultaneously receivable in the indentations of vertically-adjacent pairs of said indentations.

21. The assembly of claim 19 in which each of said indentations includes a vertical bearing surface, said paired projections of said clip frictionally engaging the bearing surfaces of a pair of said indentations.

22. The assembly of claim 21 in which said bearing surfaces of a pair of indentations extend along planes intersecting each other at an angle within the range of 30° to 120°.

23. The assembly of claim 22 in which said angle is approximately 60°.

24. The assembly of claim 16 in which said frame members of said shelf are each provided with a horizontal upper flange, said upper flange having a top surface substantially flush with said upper arm of a clip adjacent thereto.

25. The assembly of claim 16 in which said frame members are generally C-shaped in vertical section and include upper and lower flanges joined by a substantially vertical connecting wall, each of said lower flanges sloping downwardly from said vertical connecting wall to promote drainage of liquids from said frame.

* * * * *